(12) United States Patent
Karguth et al.

(10) Patent No.: US 12,339,795 B2
(45) Date of Patent: *Jun. 24, 2025

(54) CIRCUIT DEVICE WITH MULTIPLE PARALLEL DATA PATHS

(71) Applicant: TEXAS INSTRUMENTS INCORPORATED, Dallas, TX (US)

(72) Inventors: Brian Jason Karguth, Van Alstyne, TX (US); Charles Lance Fuoco, Allen, TX (US); Samuel Paul Visalli, Allen, TX (US); Michael Anthony Denio, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,522

(22) Filed: Feb. 20, 2024

(65) Prior Publication Data

US 2024/0193112 A1    Jun. 13, 2024

Related U.S. Application Data

(63) Continuation of application No. 17/971,707, filed on Oct. 24, 2022, now Pat. No. 11,907,145, which is a continuation of application No. 17/099,896, filed on Nov. 17, 2020, now Pat. No. 11,481,345, which is a continuation of application No. 16/600,881, filed on Oct. 14, 2019, now Pat. No. 10,838,896.

(60) Provisional application No. 62/745,892, filed on Oct. 15, 2018.

(51) Int. Cl.
*G06F 13/28*     (2006.01)
*G06F 13/40*     (2006.01)

(52) U.S. Cl.
CPC .......... *G06F 13/28* (2013.01); *G06F 13/4027* (2013.01)

(58) Field of Classification Search
CPC ............ G06F 12/1081; G06F 2213/28; G06F 13/287; G06F 13/28; G06F 13/4022; G06F 13/4027
See application file for complete search history.

(56) References Cited

U.S. PATENT DOCUMENTS

| | | |
|---|---|---|
| 5,664,142 A | 9/1997 | Boldt et al. |
| 5,748,945 A | 5/1998 | Ng |
| 6,081,851 A | 6/2000 | Futral et al. |
| 6,493,803 B1 | 12/2002 | Pham et al. |
| 6,675,200 B1 | 1/2004 | Cheriton et al. |
| 6,996,655 B1 | 2/2006 | Lee et al. |
| 7,603,488 B1 | 10/2009 | Gravenstein et al. |
| 10,838,896 B2 | 11/2020 | Karguth et al. |

(Continued)

*Primary Examiner* — Raymond N Phan
(74) *Attorney, Agent, or Firm* — Brian D. Graham; Frank D. Cimino

(57) ABSTRACT

An integrated circuit (IC) includes first and second memory devices and a bridge. The IC also includes a first interconnect segment coupled between the first memory device and the bridge. The IC further includes a second interconnect segment coupled between the first and second memory devices, and a third interconnect segment coupled between the bridge and the second memory device. The IC includes a first DMA circuit coupled to the first interconnect segment, and a second DMA circuit coupled to the second interconnect segment. A fourth interconnect segment is coupled between the first and second DMA circuits.

20 Claims, 4 Drawing Sheets

(56) References Cited

U.S. PATENT DOCUMENTS

| | | | |
|---|---|---|---|
| 10,853,308 B1 | 12/2020 | Subramanian et al. | |
| 11,907,145 B2 * | 2/2024 | Karguth | G06F 13/28 |
| 2008/0109604 A1 | 5/2008 | Reilly et al. | |
| 2009/0037900 A1 | 2/2009 | von Khurja et al. | |
| 2010/0082850 A1 | 4/2010 | Yokomizo | |
| 2012/0191964 A1 | 7/2012 | Lee et al. | |
| 2015/0127994 A1 | 5/2015 | Sankar et al. | |
| 2016/0350246 A1 | 12/2016 | Steedman et al. | |

* cited by examiner

CIRCUIT DEVICE WITH MULTIPLE PARALLEL DATA PATHS

CROSS-REFERENCE TO RELATED APPLICATIONS

This application is a continuation of U.S. application Ser. No. 17/971,707, filed Oct. 24, 2022, which is a continuation of U.S. application Ser. No. 17/099,896, filed Nov. 17, 2020, now U.S. Pat. No. 11,481,345, which is a continuation of U.S. application Ser. No. 16/600,881, filed Oct. 14, 2019, now U.S. Pat. No. 10,838,896, which claims priority to U.S. Provisional Application No. 62/745,892, filed Oct. 15, 2018, each of which is incorporated herein by reference.

BACKGROUND

The movement of data within an electronic system generally involves moving data from a source location to a destination location. Direct memory access (DMA) is a technique whereby a DMA controller is programmed to a move a specified amount of data starting at a source address to a destination starting at a destination address. The movement of the data traverse the communication infrastructure of the electronic system. Some systems, such as systems-on-chip (SoCs), are relatively highly segmented meaning that there are multiple bus interconnects and bridges through which data is moved. Traversing a bridge coupled between two bus segments can involve significant latency as the data coming into the bridge is temporarily buffered before it is then written out to the destination bus while also adhering to the timing requirements of the various buses and bridges comprising the communication infrastructure. Depending on the use of the data being moved, excessive latency can be problematic. For example, some devices have high speed serial ports that have internal buffers which may be too small to compensate for the round-trip latency. That is, data may be received into a buffer and the buffer may trigger a DMA request upon the buffer being filled to a threshold point. The DMA engine, however, may be coupled to the buffer over numerous bridges and interconnect segments, and thus a delay occurs as the DMA request is in transit from the buffer to the DMA engine. During the delay, the buffer may undesirably overflow.

SUMMARY

In one example, an integrated circuit (IC) includes first and second memory devices and a bridge. The IC also includes a first interconnect segment coupled between the first memory device and the bridge. The IC further includes a second interconnect segment coupled between the first and second memory devices, and a third interconnect segment coupled between the bridge and the second memory device. The IC includes a first DMA circuit coupled to the first interconnect segment, and a second DMA circuit coupled to the second interconnect segment. A fourth interconnect segment is coupled between the first and second DMA circuits.

BRIEF DESCRIPTION OF THE DRAWINGS

For a detailed description of various examples, reference will now be made to the accompanying drawings in which.

DETAILED DESCRIPTION

Figure 1:
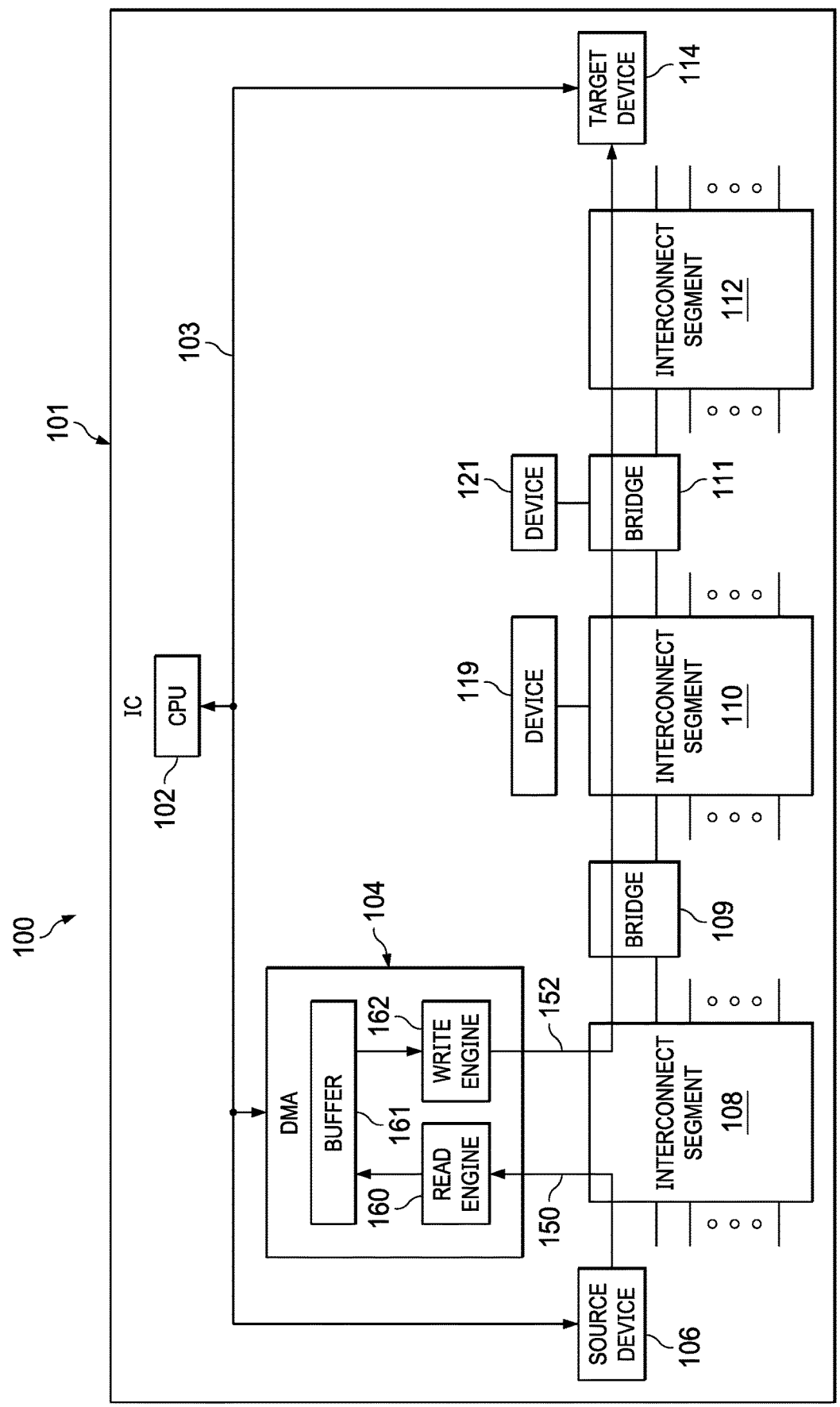
FIG. 1 illustrates a system in which a DMA circuit is usable to perform a DMA write operation.

FIG. 1 shows an example of an electronic system 100. The system 100 in this example includes a central processing unit (CPU) 102, a direct memory access (DMA) circuit 104, a source device 106, multiple interconnect segments 108, 110, and 112, bridges 109 and 111, and a target device 114. In this example, the CPU 102, interconnect segments 108, 110, and 112, bridges 109 and 111, source device 106, and target device 114 are provided on the same integrated circuit (IC) 101. System 100 may comprise a system-on-chip (SoC). The source device 106 may comprise a memory device or a peripheral device. The target device 114 may comprise a memory device or a peripheral device. Examples of peripheral devices include an analog-to-digital converter (ADC) and a multichannel Serial Peripheral Interconnect (SPI) interface. The CPU 102 is coupled to the source and target devices 106, 114 and to the DMA circuit 104 via a bus 103. The CPU 102 can write data to, and read data from, source device 106 as well as target device 114.

The source and target devices 106, 114 are coupled together by a series of interconnect segments and bridges. In the example of FIG. 1, a communication pathway between the source and target devices 106, 114 includes interconnect segments 108, 110, and 112 and bridges 109 and 111. Each interconnect segment 108, 110, 112 may be implemented as a switch (e.g., a cross-bar switch) having multiple inputs and multiple outputs. Source device 106 is coupled to an input of interconnect segment 108, and an output of interconnect segment 108 is coupled to bridge 109. The bridge 109, in turn, is coupled to an input of interconnect segment 110, and an output of interconnect segment 110 is coupled to bridge 111. Bridge 111 is coupled to an input of interconnect segment 112, and an output of interconnect segment 112 is coupled to target device 114. Although three interconnect segments 108, 110, 112 and two bridges 109, 111 are shown in the example of FIG. 1, any number of interconnect segments and bridges may be included.

The DMA circuit 104 can be programmed by commands from the CPU 102 to move data from the source device 106 to the target device 114 to thereby alleviate the CPU 102 itself having to read data from the source device 106 and write such data to the target device 114. The CPU 102, for example, may program a source address, a destination address, and a count (e.g., byte count, word count, etc.) into the DMA circuit 104. The source address may correspond to a starting address within the source device 106 where the data begins that is to be written to the target device 114, and the destination address corresponds to the address within the target device to which the data is to be written. The count indicates the amount of data to be written. Arrows 150 and 152 indicate the flow of data during a DMA write operation. Initially, a read engine 160 within the DMA circuit 104 reads data from the source device 106 as indicated by arrow 150. The data is read into a buffer 161. A write engine 162 (also within the DMA circuit 104) writes the data from the buffer 161 to the target device 114 as indicated by arrow 152. The read engine 160 and the write engine 162 are both part of the same DMA circuit 104. As such, the DMA architecture of FIG. 1 represents a "unified" DMA architecture.

The system 100 of FIG. 1 comprises a "segmented" system meaning that data generally flows through multiple interconnect segments 108, 110, 112 and bridges 109, 111 between a source device (e.g., source device 106) and a target device (e.g., target device 114) on the system. As data flows from the source device through the interconnect segment 108 to interconnect segment 110 through bridge 109, a latency occurs in bridge 109 as the data may be temporarily stored in buffers within the bridge 109. Further, the interconnect segments 108, 110, and 112 may implement a "blocking" protocol which means that a data transaction (such as the data flow represented by arrow 152 through the interconnect segments 108, 110, and 112 and bridges 109 and 111) may be "blocked" by other transactions such as a data movement from device 119 through interconnect segment 110 and bridge 111 to device 121.

The latency of the read transaction from the source device 106 into the DMA circuit 104 is fairly low as the data only traverses one interconnect segment 108 in this example. However, the latency of the write transaction from the DMA circuit 104 to the target device 114 may be fairly high as the data traverses three interconnect segments 108, 110, and 112 and two bridges 109 and 111.

Figure 2:
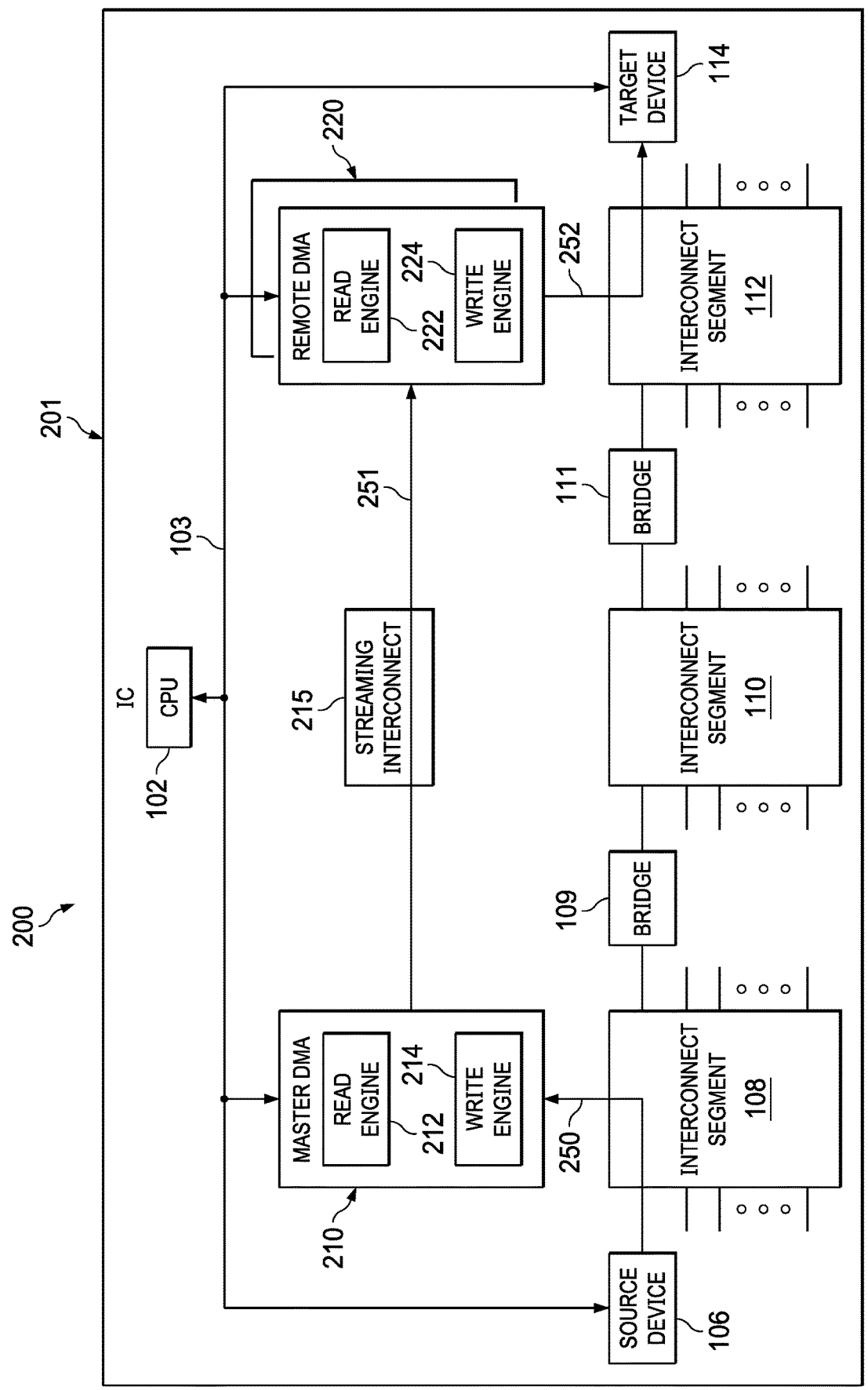
FIG. 2 illustrates a system comprising a split-DMA architecture and the use of the split-DMA architecture to perform a DMA write operation.

FIG. 2 shows another example of a system 200 (e.g., an SoC) comprising a split DMA architecture. The system 200 includes the source device 106, target device 114, interconnect segment 108, 110, and 112, and bridges 109 and 111 as described above with regard to FIG. 1. The components shown in FIG. 2 are provided on an IC 201. CPU 102 also is shown coupled to source and target devices 106 and 114 via bus 103. Instead of a single DMA circuit as was the case for the example of FIG. 1, a master DMA circuit 210 and a remote DMA circuit 220 are shown in the example of FIG. 2. The master DMA circuit 210 includes a read engine 212 and a write engine 214. Similarly, the remote DMA circuit includes a read engine 222 and a write engine 224. However, during a DMA write operation, the read engine 212 of the master DMA circuit 210 and the write engine of the remote DMA circuit 220 are used, and not both read and write engines within any one DMA circuit. Similarly, during a DMA read operation, the write engine 214 of the master DMA circuit 210 and the read engine of the remote DMA circuit 220 are used (as will be illustrated in the example of FIG. 4). A streaming interconnect 215 is coupled between the master DMA circuit 210 and the remote DMA circuit 220. More than one remote DMA circuit 220 can be coupled to the master DMA circuit 210 via the streaming interconnect 215. The DMA architecture is referred to as a "split" DMA architecture because the DMA architecture comprises master and remote DMA circuits separated by a streaming interconnect. As such, the read and write engines of such separate DMA circuits are used for DMA write and read operations.

Arrows 250, 251, and 252 illustrate the data flow of a DMA write operation for the example of FIG. 2. The master DMA circuit 210 includes a read engine 212 that reads (250) data from source device 106, and transfers (251) such data via the streaming interconnect 215 to the remote DMA circuit 220. The remote DMA circuit 220 includes a write engine 222 which writes the data received from the master DMA circuit 210 to the target device 114. The write data thus traverses the streaming interconnect 215 instead of bridge 109, interconnect 110, and bridge 111 as was the case in FIG. 1. As such, the write data in FIG. 2 traverses fewer hops and thus experiences less latency than was the case for FIG. 1. The DMA architecture of FIG. 2 comprises a split DMA architecture in that the read engine 212 is separated from the write engine 222 by the streaming interconnect.

Further, the streaming interconnect 215 implements a "non-blocking" communication protocol. A non-blocking protocol means that, upon the master DMA circuit 210 attempting to initiate a data transaction (251) through the streaming interconnect 215 to the master DMA circuit 210, the transaction is guaranteed to complete without taking more than a threshold amount of time and without being blocked or otherwise interrupted by other transactions that may flow through the streaming interconnect. The latency experienced in a non-blocking fabric is primarily due to any variation of rate (the combination of clock speed and data path width) at various points in the fabric and arbitration pushback which occurs when more than one source tries to use a specific path in the fabric. These causes of latency are fully bounded in a non-blocking fabric. In a blocking fabric, the response latency of the target itself is not bounded. If the target of a data transfer does not have sufficient buffer capacity in which to place the data which is being transferred, then the target must push back on the fabric for as long as necessary until buffering frees up. In a non-blocking fabric, sufficient buffer capacity is guaranteed.

In one example, the system implements a dynamic mode in which the CPU 102 programs the master DMA circuit 210, and the master DMA circuit 210 transmits a transfer control parameter set across the non-blocking streaming interconnect 215 to the remote DMA circuit 220 to program the remote DMA circuit 220. A proxy is provided by the master DMA circuit 210 which maps accesses to memory mapped registers for the streaming interconnect 215 and converts the accesses to configuration read/write commands. Such configuration read/write commands are transmitted across the streaming interconnect 215 to the remote DMA circuit 220.

Figure 3:
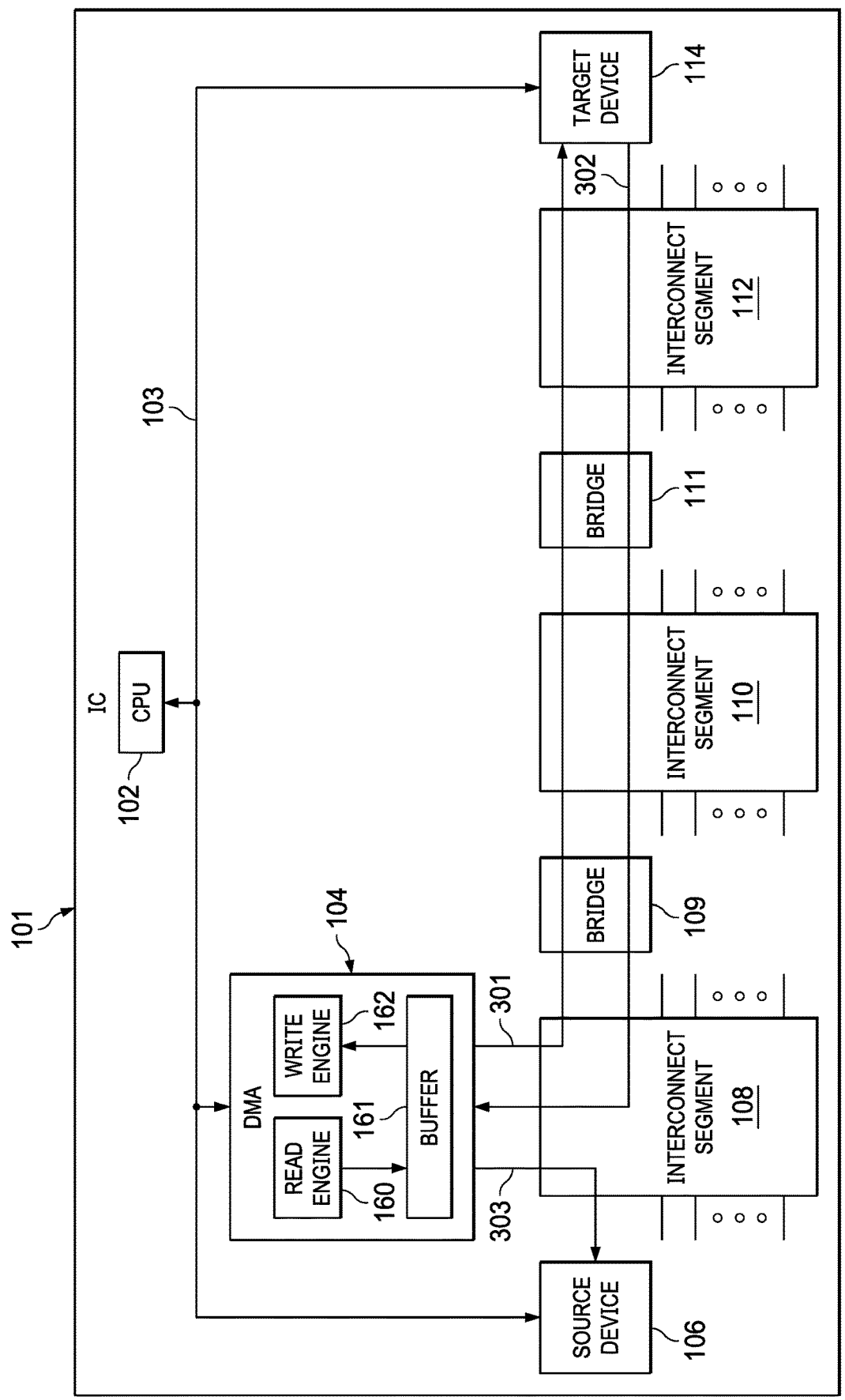
FIG. 3 illustrates the use of the system of FIG. 1 to perform a DMA read operation.
Figure 4:
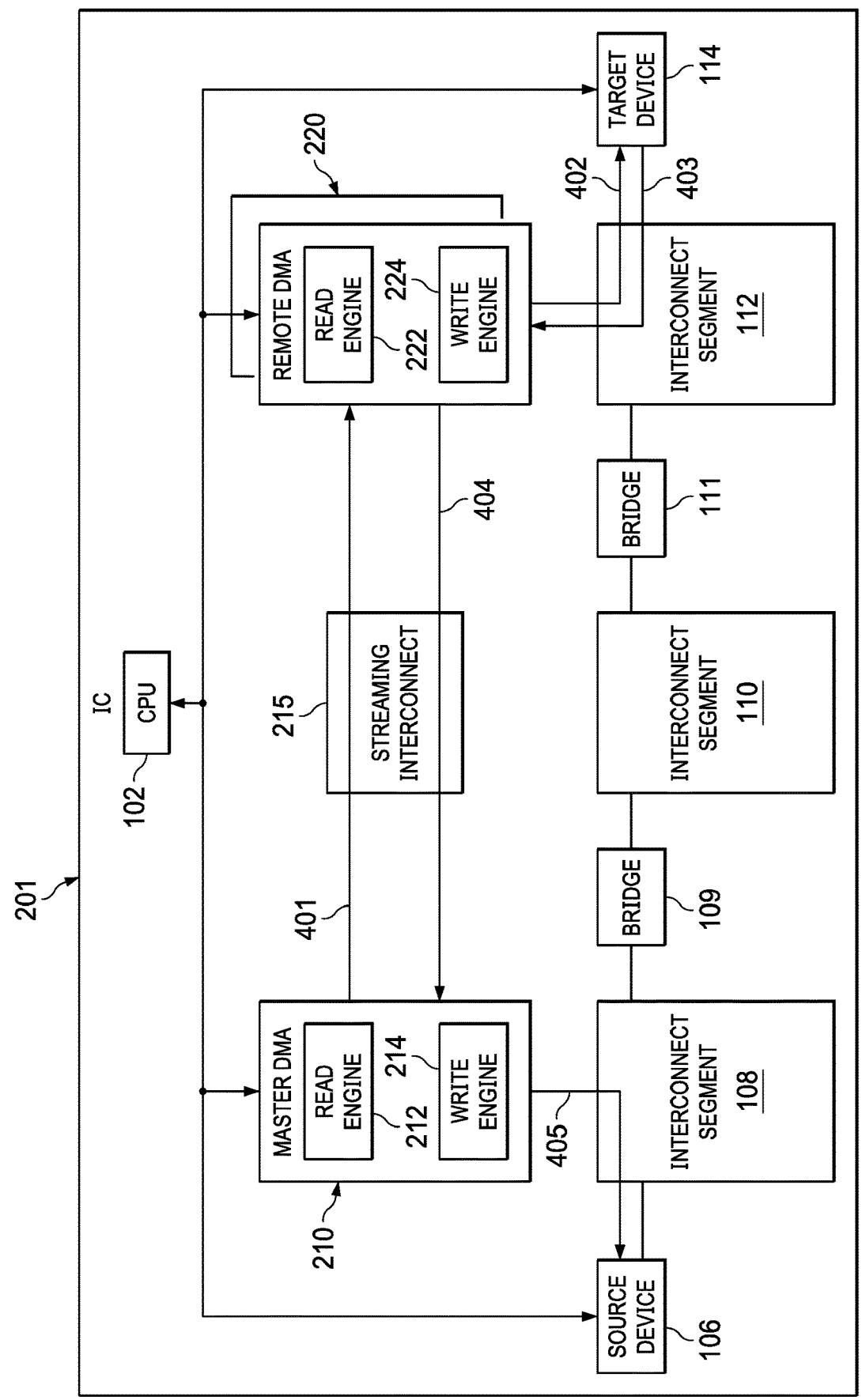
FIG. 4 illustrates the use of the split-DMA architecture of FIG. 2 to perform a DMA read operation.

The examples of FIGS. 1 and 2 illustrate DMA write operations. FIGS. 3 and 4 illustrate DMA read operations, for example, to read data from target device 114 and write the data to the source device 106. The reference to the adjectives "source" and "target" are used merely to readily distinguish the devices from each other. The source device can be the source of data sent to the target device (as in the case of DMA write operations as in FIGS. 1 and 2), and, as in the example of FIGS. 3 and 4, can be the recipient of data from the target device during a DMA read operation.

FIG. 3 is the same architecture as FIG. 1, that is, one DMA circuit usable to perform a DMA read operation as shown. The DMA read operation performed by DMA circuit 104 comprises three portions 301, 302, and 303. In portion 301, The DMA read engine 160 issues a read command to the target device 114. The read command traverses interconnect segments 108, 110, and 112 and bridges 109 and 11 as shown and is received by the target device 114. The target device 114 returns the requested data at 302. The return data (302) traverses the same communication pathway in the reverse direction, that is through interconnect segment 112, bridge 111, interconnect segment 110, bridge 109, and interconnect segment 108. The DMA write engine 162 then writes the returned data at 303 through interconnect segment 108 to the source device 106.

The DMA read operation in the example of FIG. 3 also experiences latency due to the traversal through multiple interconnect segments and bridges, and the latency is worse than that of FIG. 1 because of the latency experienced by the read command (301) in one direction and the return data (302) in the opposite direction.

FIG. 4 shows the split-DMA architecture of FIG. 2 but for a DMA read operation. The DMA read operation in the example of FIG. 4 is divided into portions 401-405. At 401, the master DMA circuit 210 issues a read command to the remote DMA circuit 220 for data starting a starting read address. The read command from the master DMA circuit 210 to the remote DMA circuit 220 flows through the streaming interconnect 215, and not interconnect segment 108, bridge 109, interconnect segment 110, and bridge 111. A read engine 422 within the remote DMA circuit 220 forwards the read command at 402 to the target device 114 through interconnect segment 112. The target device 114 returns (430) the requested read data back through the interconnect segment 112 to the remote DMA circuit 220. The remote DMA circuit 220 then forwards the returned read data at 404 through the streaming interconnect 215 to the master DMA circuit 210. At 405, a write engine 420 within the master DMA circuit 210 writes the read data from the target device 114 to the source device 106 through interconnect segment 108.

Because the communication pathway between the master and remote DMA circuits 210, 220 comprises the streaming interconnect 215, and not bridge 109, interconnect segment 110, and bridge 111, fewer interconnect hops are required in performing a DMA read operation with the split-DMA architecture of FIG. 4 than the unified DMA read/write engine architecture of FIG. 3. Consequently, the DMA read operation of FIG. 4 will experience less latency than the DMA read operation of FIG. 3.

As shown in FIGS. 2 and 4, multiple remote DMA circuits 220 may interact with the master DMA circuit 210 via the streaming interconnect 215. The streaming interconnect 215 can service multiple remote DMA circuits 220 and thus multiple target devices 114 with non-blocking, interleaved threads (e.g., packets associated with different transactions passing concurrently through the streaming interconnect 215).

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

What is claimed is:

1. A system comprising:
a processing unit;
a first data path configured to couple a source device to a target device, wherein the first data path is a blocking data path and includes:
a first interconnect segment configured to couple to the source device;
a second interconnect segment configured to couple to the target device; and
a bridge circuit coupled between the first interconnect segment and the second interconnect segment;
a data read circuit coupled to the processing unit and configured to couple to the source device;
a data write circuit coupled to the processing unit and configured to couple to the target device; and
a second data path coupled between the data read circuit and the data write circuit, wherein the second data path is a non-blocking data path.

2. The system of claim 1, wherein:
the data read circuit is configured to couple to the source device via the first interconnect segment; and
the data write circuit is configured to couple to the target device via the second interconnect segment.

3. The system of claim 1, wherein the second data path includes a streaming interconnect coupled between the data read circuit and the data write circuit.

4. The system of claim 1, wherein:
the processing unit is configured to cause a transfer of data between the source device and the target device via the data read circuit and the data write circuit by providing a first instruction to the data read circuit; and
the data read circuit is configured to, in response to the first instruction, transmit a second instruction to the data write circuit.

5. The system of claim 4, wherein the data read circuit is configured to transmit the second instruction to the data write circuit via the second data path.

6. The system of claim 1, wherein at least one of the source device and the target device includes an analog-to-digital converter or a serial peripheral interconnect interface.

7. The system of claim 1 further comprising the source device and the target device.

8. The system of claim 1, wherein:
the data read circuit is a first data read circuit;
the data write circuit is a first data write circuit; and
the system further comprises:
a second data write circuit, wherein the second data write circuit and the first data read circuit are coupled to the source device by the first interconnect segment; and
a second data read circuit, wherein the second data read circuit and the first data write circuit are coupled to the target device by the second interconnect segment.

9. The system of claim 1, wherein the source device and the target device each include a peripheral device or a memory.

10. A system comprising:
a source device;
a target device;
a first data path coupled between the source device and the target device, wherein the first data path is a blocking data path and includes:
a first interconnect segment coupled to the source device;
a second interconnect segment coupled to the target device; and
a bridge circuit coupled between the first interconnect segment and the second interconnect segment;
a read circuit coupled to the source device;
a write circuit coupled to the target device; and
a second data path coupled between the read circuit and the write circuit, wherein the second data path is a non-blocking data path.

11. The system of claim 10, wherein:
the read circuit is coupled to the source device via the first interconnect segment; and
the write circuit is coupled to the target device via the second interconnect segment.

12. The system of claim 10, wherein the second data path includes a streaming interconnect coupled between the read circuit and the write circuit.

13. The system of claim 10, wherein the read circuit is configured to:
   receive a first instruction regarding a transfer of data between the source device and the target device via the read circuit and the write circuit;
   in response to the first instruction, transmit a second instruction to the write circuit; and
   in conjunction with the write circuit, transfer the data between the source device and the target device.

14. The system of claim 10, wherein the source device and the target device each include a peripheral device or a memory.

15. The system of claim 10, wherein at least one of the source device and the target device includes an analog-to-digital converter or a serial peripheral interconnect interface.

16. The system of claim 13, wherein the read circuit is configured to transmit the second instruction to the write circuit via the second data path.

17. The system of claim 10, wherein:
   the read circuit is a first read circuit;
   the write circuit is a first write circuit; and
   the system further comprises:
      a second write circuit, wherein the second write circuit and the first read circuit are coupled to the source device by the first interconnect segment; and
      a second read circuit, wherein the second read circuit and the first write circuit are coupled to the target device by the second interconnect segment.

18. A device comprising:
   a first data path configured to couple between a source device and a target device, wherein the first data path is a blocking data path and includes:
      a first interconnect segment coupled to the source device;
      a second interconnect segment coupled to the target device; and
      a bridge circuit coupled between the first interconnect segment and the second interconnect segment;
   a read circuit configured to couple to the source device;
   a write circuit configured to couple to the target device; and
   a second data path coupled between the read circuit and the write circuit, wherein the second data path is a non-blocking data path.

19. The device of claim 18, wherein the second data path includes a streaming interconnect coupled between the read circuit and the write circuit.

20. The device of claim 19, wherein the read circuit is configured to:
   transmit an instruction to the write circuit associated with a transfer of data between the source device and the target device via the read circuit and the write circuit; and
   in conjunction with the write circuit, transfer the data between the source device and the target device.

* * * * *